United States Patent [19]
George, Jr.

[11] Patent Number: 5,939,102
[45] Date of Patent: Aug. 17, 1999

[54] APPARATUS FOR ENCAPSULATING FIELD WINDINGS OF ROTARY ELECTRIC MACHINES

[76] Inventor: Francis L. George, Jr., 12618 Rambling Oaks, Sunset Hills, Mo. 63128

[21] Appl. No.: 08/613,713

[22] Filed: Mar. 11, 1996

[51] Int. Cl.⁶ .................................................. B29C 45/02
[52] U.S. Cl. .................... 425/127; 264/272.2; 425/129.1
[58] Field of Search .................................. 425/110, 112, 425/116, 117, 121, 127, 129.1, 544, DIG. 228; 264/272.2

[56] References Cited

U.S. PATENT DOCUMENTS

| | | |
|---|---|---|
| 3,543,349 | 12/1970 | Marocco . |
| 3,758,799 | 9/1973 | Dochterman et al. . |
| 3,874,073 | 4/1975 | Dochterman et al. . |
| 3,877,856 | 4/1975 | Valentini . |
| 4,362,490 | 12/1982 | Machida et al. . |
| 4,496,866 | 1/1985 | Yamamoto et al. . |
| 4,950,438 | 8/1990 | Nakamura et al. . |
| 4,966,538 | 10/1990 | Linke et al. . |
| 5,474,799 | 12/1995 | Thigpen et al. . |
| 5,597,523 | 1/1997 | Sakai et al. . |
| 5,759,589 | 6/1998 | George, Jr. . |

Primary Examiner—Tim Heitbrink
Attorney, Agent, or Firm—Armstrong Teasdale LLP

[57] ABSTRACT

It is generally known that the most common reason for replacing rotary electric machines is failure of field windings. Vibrations and primary overheating of field windings is the main reason for motor and generator repair. Consequently field windings have been fan cooled, externally ventilated, and totally enclosed. To solve this failure problem stators have been completely encapsulated, drip coated, and entirely coated. But all of these procedures are subject to certain disadvantages. The method and apparatus herein overcome such disadvantages. Apparatus is provided for embedding in a solid material field windings of stators of rotary electric machines in order to insulate and cool electric machines in which the stators are employed.

6 Claims, 2 Drawing Sheets

APPARATUS FOR ENCAPSULATING FIELD WINDINGS OF ROTARY ELECTRIC MACHINES

FIELD OF THE INVENTION

This invention relates to rotary electric machines, also termed dynamoelectric machines, which convert electrical energy to mechanical energy or mechanical energy to electrical energy. Contemplated are electric motors, generators, alternators and the like, in which the stator is the type which includes a stator core carrying field windings and having a bore or cylindrical cavity in its center to receive a rotor or armature.

BACKGROUND OF THE INVENTION

It is generally known that the most common reason for failure of rotary electric machines, far more than locked bearings, is burnout of field windings. Primary overheating is the main reason for motor and generator repair. For this reason fan cooled, externally ventilated, and totally enclosed motors and generators have been developed.

Recently in order to solve the burnout problem, emphasis has been on molding methods, and on molds for completely encapsulating the stator core and coils, or field windings. In U.S. Pat. No. 4,950,438, for instance, a four piece mold is employed to overcome the drip method, that is the method wherein the stator is drip coated on only one side at a time during a coating cycle, followed by then turning the stator to coat it on the other side. In U.S. Pat. No. 4,950,438 the stator is entirely in the upright position while being coated. The four mold members are combined with the stator so that a cavity is formed between them and the stator. Vehicle is then poured into that cavity through sprues until it flows out of drain holes in the lower mold member.

Another sprue-type method for trading rotary electric machines is described in U.S. Pat. No. 4,362,490. It was believed that when the stator was entirely coated with vehicle too large a volume of vehicle was utilized at a cost which was too high. The invention, then, was to eliminate the coating on the periphery of the stator. To do so upper and lower mold members were utilized to define an inner space around the coil. Through a sprue leading to this space a material was injected so that it flowed into that space to permeate the coil.

Because of the large volume of vehicle required by other electromagnetic coil coating methods the drip method still appears to be popular as illustrated in U.S. Pat. No. 5,474,799. The vehicle baking or curing temperatures were a matter of concern in that instance. The problem was solved by keeping the temperature of the iron stator core below the vehicle curing temperature by utilizing several curing temperature stages.

A submersible can-type electric motor, stated to be well-known, is the subject of U.S. Pat. No. 4,496,866. The bore of the stator core has a cylindrical can inserted therein to cover its inner wall. A vehicle is then inserted to be molded completely about the external surface of the stator core including the end portions of the coils.

In addition to vehicle-molded rotary electric machines such as those described, two related patents, U.S. Pat. No. 3,874,073 and U.S. Pat. No. 3,758,799, disclose the use of sand and other particulate materials such as alumina, mica, chalk, zirconia, beryllium oxide, and naturally occurring minerals, as heat dissipating matter around the windings which are supported on the stator core. Using a housing means around at least part of the stator the particulate material, along with vehicle, is forced in against the winding support.

It will be understood that one of the problems in utilizing sprues—or sprays as in FIG. 9 of U.S. Pat. No. 3,874,073—is that it is difficult, even when pressure is employed, to fill all of the interstices and to eliminate air voids in the stator windings. When the area formed by a mold is filled from above with a vehicle as viscous as those normally employed, it is difficult if not impossible to avoid the formation of air voids, pockets or pores. This is particularly true when particulate materials are incorporated in the vehicle. Voids are also difficult to prevent when the port holes used to enable air to escape from the windings are in the base of the mold. The prior art, then, is subject to certain disadvantages. By the practice of this invention a method and means are provided which overcome such disadvantages.

SUMMARY OF THE INVENTION

It will be appreciated that by this invention a rotary machine is provided which results in insulated and cooler operating field windings. Means are provided for embedding in a solid vehicle field windings of stators of rotary electric machines in order to insulate and cool electric machines in which the stators are used. The stator is the type having a stator core provided with a central cylindrical bore adapted to receive a rotor. The stator core carries field windings held in channels in the face of the cylindrical bore. The field windings are looped outside those channels to form top and bottom field windings as they pass from one channel to another. Herein means are provided for encapsulating these top and bottom field windings, and for embedding in a solidified vehicle the field windings in the channels therebetween. Cylindrical sleeve means are adapted to surround the top and bottom field windings so that they are each within a sleeve. A space holding cylinder fitting slidably in the stator bore is locked in the bore to occupy the bore space. In conjunction with the sleeve it forms top and bottom annular areas in which the field windings reside. Closure means are adapted to accept a cylindrical sleeve means end as well as the space saving cylinder when the stator is on an end. This structure forms a closed lower annular area, and an open upper annular area connected by the channels which allow air to escape. An inlet port opens into the lower annular area. Pressure means force a liquid vehicle which solidifies on standing through the inlet port, into the annular area, and throughout the bottom field windings, and then up the field windings channels to cover the upper field windings. This encapsulates both lower and upper field windings, embedding them in the vehicle which later solidifies.

DETAILED DESCRIPTION OF THE INVENTION

Since motors, generators, alternators, and the like are old and well-described in the prior art, they need not be lengthily described herein except to point out that in these rotary electric machines practically all of the electro/mechanical energy conversion takes place in the air gap between the stator and the rotor or armature. The energy conversion in the air gap is a result of a magnetic field set up by current-carrying windings in motors, or by windings moving in a magnetic field in the case of generators and alternators. These stator windings, also termed field windings, primary windings, or stator coils, thus, are the key to any rotary electric machine. Little wonder, then, that from their inception these windings have been protected in some way. They have been wrapped, and they have been coated or impregnated by drip coating and brush coating with, and later by dipping in, varnishes. The realization that it was vital to prevent destruction of field windings by heat, vibrations, and other environmental forces, has lead to molding processes such as those previously described, to the coating method of U.S. Pat. No. 5,474,799, and to the improvement herein. In order to explain this improvement more fully it will be described with reference to six figures in a drawing.

SPECIFIC EMBODIMENT OF THE INVENTION

Figure 1:
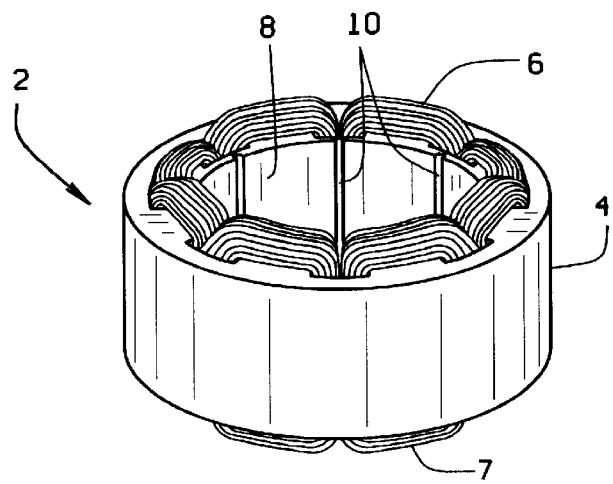
FIG. 1 is an isometric view showing a stator with its stator coil which is to be impregnated by the process of the invention.

It is to be appreciated that even though the improvement of rotary electric machines is a matter which is dealt with herein the rotor is not being shown in the drawings. Such rotors or armatures are very well known, and they are not the essence of this invention. Rather, members of rotary electric machines with which this invention is concerned are illustrated. These elements, shown in FIG. 1, include a stator 2 consisting of an iron stator core 4, and top and bottom field windings 6 and 7, termed top and bottom coil heads in U.S. Pat. No. 5,474,799, along with central cavity or stator bore 8 in the stator core. Other components of the invention are depicted in FIG. 2.

Iron core 4 has a series of internal axially extending channels 10, termed slots in U.S. Pat. No. 5,474,799. Each channel 10, usually lined with an insulating paper referred to as a top stick, accommodates copper wires which are wound through the channels to form the stator coils. The stator coils protrude axially from both ends to form top and bottom field windings 6 and 7 which loop from one channel to another. It is these top and bottom stator coils, or field windings 6 and 7, which are protected and mechanically stabilized against vibrations. Herein an expedient means for protecting field windings is provided. The essential elements utilized in the process include a sleeve 11, a space holding cylinder 12, and a closure means 22, whose functions will be described subsequently in connection with the operation or method of the invention.

Referring now to the components per se, space holding cylinder 12 is a strong plastic or metal cylindrical element. It is adapted to fit snugly in the central cavity 8 within the stator core which a rotor or armature usually occupies. The size of the cylinder, thus, depends upon the rotary electric machine size, actually on the size of bore 8 in stator core 4. The space holding cylinder 12 should be at least as long as the distance from the tops of the top and bottom field windings 6 and 7 so that the field windings are in an annular space between the sleeve 11 and the space holding cylinder 12. The space holding cylinder is slidable in the stator core bore to confine a vehicle which later will rise through the channels.

The sleeve 11, on the other hand, is an open-ended cylinder or tube. Its size is also related to the size of the stator. Sleeve 11, seen in FIG. 2, should slide over the outside of the stator core (4) as shown in that figure, fitting closely around the outside of the stator as illustrated.

Employed in conjunction with sleeve 11 is a closure means 22 adapted to close off one of the open ends of sleeve 11. Various closure means can be used. In the specific embodiment shown in FIG. 2 the means which closes one end of sleeve 11 is in the form of a sleeve bottom when the sleeve is stood on one of its ends. This closure means is structured as a base plate 22 having an upwardly projecting retainer plate or disk 14 mounted thereon. Retaining disk 14 is provided with a tapered edge to accept sleeve 11 and to provide a seal therebetween. This structure makes it easier to separate the two after treating the stator. As illustrated in FIG. 2, when sleeve 11, with the stator within it, is in a vertical position seated on tapered disk 14 of plate 22, stator 2 is contained in a cylindrical vessel or container. The reason for the container will be appreciated given the method of utilizing components of the invention.

Having discussed the components of the invention, the method of utilizing these components will now be described. One of the features of the invention is the use of pressure to eliminate air bubbles and voids during the encapsulation process. Another feature of the invention is that a pressure process renders it easier to include fillers in the vehicle to improve the cooling characteristics of the resulting encapsulation during the use of the rotary electric machine. To accomplish this, stator 2 is inserted in sleeve 11, and the sleeve and stator are stood on one end so that they can be rested on disk 14 on closure plate 22 as shown in FIG. 2. Sleeve 11 is then seated on retaining disk 14 on base plate 22 so that the stator is, in effect, in a container which is open at the top. The space holding cylinder is then inserted in the stator bore (8) so that the stator and accompanying field windings are in an annular space between space holding cylinder 12 and sleeve 11 as shown in FIG. 2. A quantity of a vehicle sufficient so that the stator core and windings will be embedded in it to the extent desired is determined by any known means. From a source under pressure, or using pressure, this vehicle, which may or may not contain a filler, is forced into the stator and its windings through one or more tubes or inlet ports such as port 28.

It is to be realized that as the vehicle is forced in port 28 it will tend to lift space holding cylinder 12, and if viscous enough it will also tend to lift the stator or sleeve. To avoid this possibility a hold-down means is utilized to lock the space holding cylinder in the bore. Various clamping means such as ski boot clamps and offset hinges can be used for the purpose. Illustrated herein for simplicity are studs 13 and hold down strap or straps 24. Studs 13, which can be bolts, pass through holes in the base plate 22 upon which the stator 2 rests. The studs then pass through matching holes in hold down strap 24, which rests against space holding cylinder 12. The strap will also keep the stator, and possibly the sleeve, from being lifted by the vehicle. However provisions must be made not to bend the field windings. As one such provision, tabs 25 can be provided which will rest against the iron stator core to protect the windings. Wing nuts 23 are then tightened to hold the structure in place, yet the hold down straps will allow air to be readily forced out of the stator by the vehicle.

Figure 3:
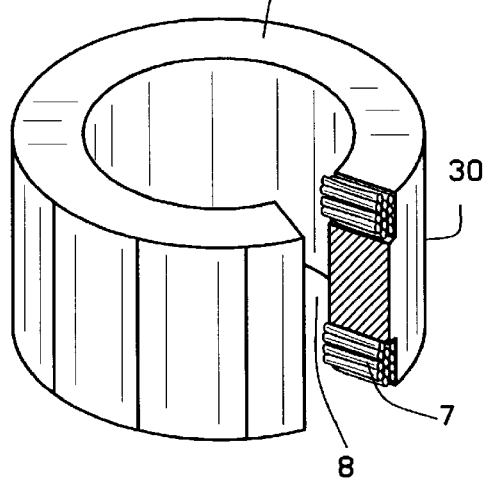
FIG. 3 is an isometric view showing the stator of FIG. 1 after its field windings have been impregnated in a solid vehicle by the process of the invention.

Returning now to the operation of the apparatus, as the vehicle rises in the annular space it will eliminate air bubbles and voids, and impregnate the lower field windings 7. After these lower field windings become embedded in vehicle, the vehicle will be driven up channels 10 in order to encapsulate upper field windings 6. After impregnation, when the vehicle is partially cured, sleeve 11 and space holding cylinder 12 are withdrawn and the vehicle is permitted to completely cure. The stator, then, looks like that illustrated in FIG. 3 rather than that in FIG. 1. It resembles a large cylindrical ring with thick walls 30 and with field windings encapsulated in an annulus 31. Using this stator the rotary electric machine is then fabricated in the conventional manner.

The term "vehicle" is utilized herein as it is used in the coatings industry wherein a vehicle is a liquid binder which changes from a liquid to a solid state by evaporation, oxidation, polymerization or reaction with a cross linking agent, commonly referred to as a curing agent. These compositions are will known in the art, and they are exemplified in such patents as U.S. Pat. No. 3,874,073 noted in the background of the invention. Included are various resins, for example, bisphenol-derived polyepoxides, novolacs, and polyesters. In addition other epoxide resins, polycarbonates, cross-linked polyethylenes and polypropylenes, and some vinyl polymers can be used, none of which need be discussed at length herein. It has also been pointed out that U.S. Pat. Nos. 3,874,073 and 3,758,799, suggest the use of various fillers. Preferred herein are silica, slate, mica, ores, minerals, chalk, starch, talc, bentonite, cabosil, alumina, calcium carbonate, magnesium oxide and other particles. All of these can be used as particulate materials for inclusion in the resins herein. In fact, we have found that a very high solids resin composition, that is one with a high sand (silica flour) to resin ratio, is very effective. Using more sand than resin has been found to greatly cut the cost of the rotary electric machines.

Figure 4:
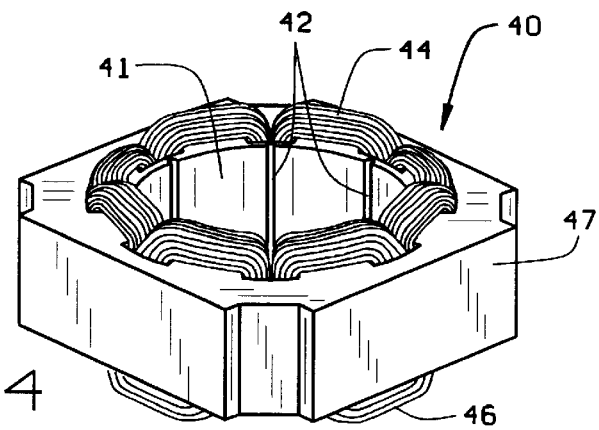
FIG. 4 is an isometric view showing a stator with a different configuration whose stator coils are to be impregnated by the process of the invention.
Figure 5:
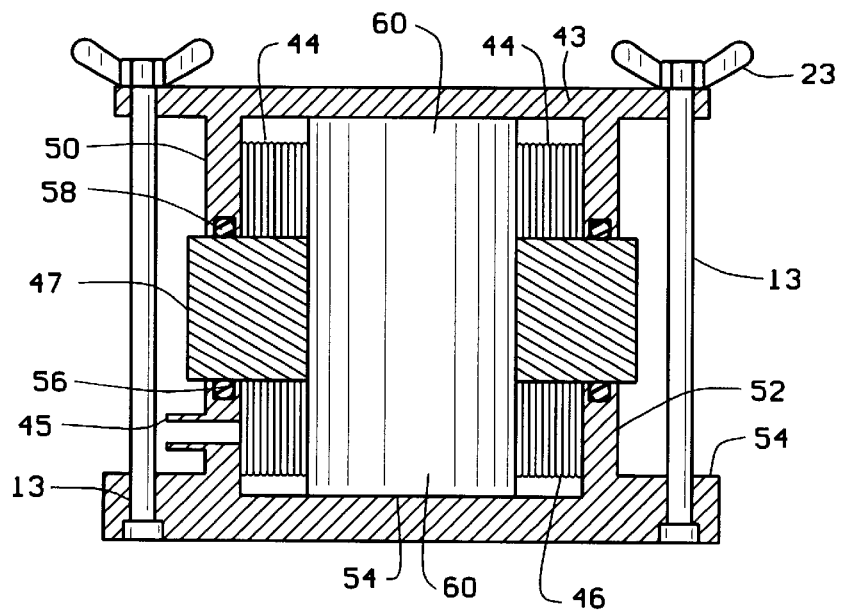
FIG. 5 is a diagrammatic sectional representation illustrating the components used to impregnate the stator coils shown in FIG. 4.

Most stators are generally cylindrical so that a sleeve such as sleeve 11 can be snugly disposed over them. The majority of stators, then, are within the invention as described. Some stators, however, are substantially rectangular such as stator 40 illustrated in FIG. 4, They are, of course, provided with normal bores 41 and axial channels 42. Referring to that figure, a rectangular sleeve could be employed according to the teachings of the invention, but it would be impractical to fill the entire area between field coils 44 and 46 and the edge of core 47 with the vehicle. Rather, a two-part sleeve, smaller than the stator core, is employed in the form of upper and lower sleeve sections. Referring to FIG. 5, the upper sleeve section is designated 50 and the lower section 52.

Employed in conjunction with lower sleeve section 52 would be a closure means adapted to close off the bottom end of that sleeve. However an extra seal can be eliminated if the closure plate, plate 54, is integral with the lower sleeve section 52. Using such an arrangement, one lower seal 56 and one upper seal 58 can be used. Since seals should be used between the bottom of the sleeve sections and the stator surfaces 46, three seals would be necessary if the lower sleeve section and the closure plate were separate elements.

Figure 2:
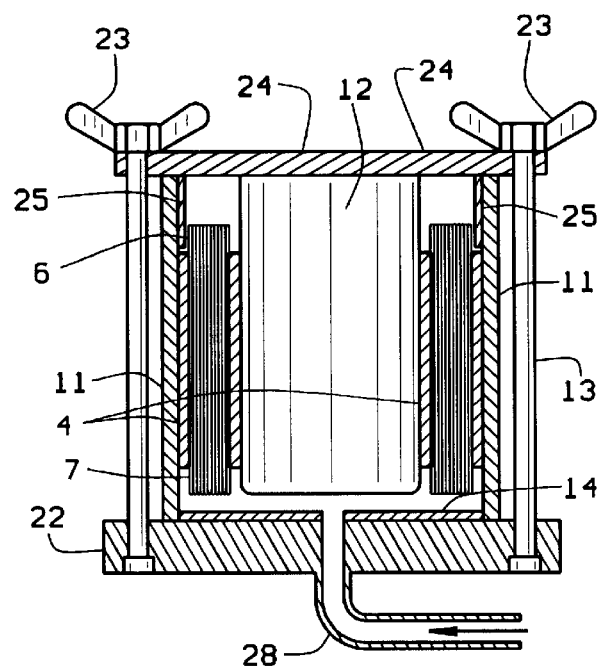
FIG. 2 is a diagrammatic sectional representation illustrating the components of the invention and their use in the process.

As were the field windings of the rotor shown in FIG. 1, field windings 44 are covered with a liquid vehicle in a manner that minimizes or eliminates air bubbles and voids as the top and bottom field windings 44 are being embedded in that vehicle.

As previously described stator 40 is stood on one end. It is then rested on lower sleeve section 52 with seal 56 in place. Upper sleeve section 50, carrying seal 58, rests against the top surface of stator core 47 (FIG. 5. As explained hereinbefore the stator is again, in effect, in a container which is open at the top. Space holding cylinder 60 is then inserted in bore 41 to form an annular space for the field windings. The vehicle, with or without a filler is forced through an inlet port 45 to impregnate the top and bottom field windings 44 as described hereinbefore. Also the hold-down means is used as discussed hereinbefore. As illistrated in FIG. 5, studs 13 pass through holes in base plate 54. The studs then pass through matching holes in hold-down strap 43 which rests against space holding cylinder 60. Although strap 43 is shown as an integral part of the upper sleeve it can be a separate component.

Figure 6:
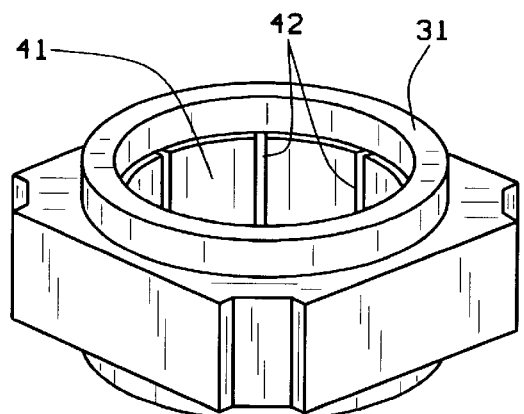
FIG. 6 is an isometric view showing the stator of FIG. 4 after its field windings have been impregnated by the process of the invention.

As earlier described after impregnating the bottom field windings, the vehicle is forced up the internal axially extending channels 42 to the area containing the top field windings. The space holding cylinder confines the liquid vehicle to the channels and to the field windings anular spaces. The open top allows air bubbles to escape and eliminates voids in the resulting encapsulation. After being permitted to completely cure, the stator looks like that illustrated in FIG. 6 with its field windings encapsulated in ring 31 as in FIG. 3. Using this stator the rotary electric machine is fabricated in the usual manner.

It can be seen that by the practice of this invention field windings or coil heads can be encapsulated by means superior to prior art methods. By embedding the field windings in a solid rather than merely coating the windings a more effective means of protecting the windings is provided. With air tending to rise, holes around the base of a mold as in the prior art rather than in an open top are not as effective in preventing air entrapment. Further, in known molding methods as vehicle fills a mold it is difficult for the vehicle to fill all of the interstices in the field windings and thus avoid the creation of voids if the air in them cannot rise to escape. This invention, then, greatly improves present means for protecting field windings in stators to be used in rotary electric machines.

Having been given the principles of the invention ramifications and variations of the invention will occur to those skilled in this art. Thus, it will also be obvious that whereas a base plate is integral with the lower sleeve section separate sleeve closing means can be utilized for easier cleaning. As an example instead of a base plate a lid can be screwed on or otherwise placed over the open end of the lower sleeve section. A stand can then be used to secure the hold-down strap during the pressure step. It will also be obvious to use a mold release to render it easier to remove the sleeve and the piston after the vehicle is partially cured.

A particularly important variation of the invention involves the use of a piston liner. Prior to its insertion in the stator bore the piston can be provided with a plastic wrapper in the form of a plastic sheet which is disposed around the outside of the piston. The piston can then readily be withdrawn from the core after the binder partially cures. This has been found to be more effective than the use of a mold release.

It will also be appreciated that the process of the invention applies not only to new rotary electric machines, but to old or existing machines being rebuilt, or improved by embedding the field windings in a solid material. These and other such modifications are deemed to be within the scope of this invention.

What is claimed is:

1. Means for embedding in a solid vehicle field windings of stators of rotary electric machines in order to insulate and cool electric machines in which the stators are used, the stator having a stator core provided with a central cylindrical bore adapted to receive a rotor, with that stator core carrying field windings held in channels in the face of the cylindrical bore, and looped outside those channels to form top and bottom field windings as they pass from one channel to another, means for encapsulating top and bottom field windings comprising cylindrical sleeve means adapted to surround the top and bottom field windings so that they are each within a sleeve, a space holding cylinder adapted to fit slidably in the stator bore to occupy the bore space and to form top and bottom annular areas with the sleeve so that the field windings are contained in those annular areas, hold-down means locking the space holding cylinder in the bore, closure means adapted to accept a cylindrical sleeve means end and the space saving cylinder when the stator is on an end, forming a closed lower annular area, and an open upper annular area allowing air to escape, a vehicle inlet port opening into the lower annular area for flow therethrough of a liquid vehicle which solidifies on standing, pressure means for forcing the liquid vehicle through the inlet port, into the annular area, and throughout the bottom field windings, and then up the field windings channels to cover the upper field windings, thus encapsulating both lower and upper field windings and embedding the field windings in the channels.

2. The embedding means of claim 1 wherein means are provided to hold the sleeve means and the stator in place as well as the space holding cylinder when the pressure means urges the vehicle into the field windings in the annular spaces.

3. The embedding means of claim 1 wherein the cylindrical sleeve means is a single cylinder slidably surrounding the entire stator.

4. The embedding means of claim 2 wherein a plurality of vehicle inlet ports are spaced around the periphery of the sleeve near the bottom.

5. The embedding means of claim 1 wherein the closure means is a plate having a seat adapted to receive the sleeve.

6. The embedding means of claim 5 wherein the piston is provided with an outer plastic wrapper.

* * * * *